US010701329B2

(12) United States Patent
Zhu et al.

(10) Patent No.: US 10,701,329 B2
(45) Date of Patent: Jun. 30, 2020

(54) WHITE BALANCE PARAMETER DETERMINATION METHOD AND WHITE BALANCE ADJUSTMENT METHOD, DEVICE, AND STORAGE MEDIUM THEREOF

(71) Applicant: Shanghai Xiaoyi Technology Co., Ltd., Shanghai (CN)

(72) Inventors: Sumin Zhu, Shanghai (CN); Yudi Zhuang, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/268,678

(22) Filed: Feb. 6, 2019

(65) Prior Publication Data
US 2019/0253683 A1    Aug. 15, 2019

(30) Foreign Application Priority Data

Feb. 9, 2018   (CN) .......................... 2018 1 0140911

(51) Int. Cl.
*H04N 9/73*   (2006.01)
*H04N 9/04*   (2006.01)
(Continued)

(52) U.S. Cl.
CPC ......... *H04N 9/735* (2013.01); *H04N 5/23229* (2013.01); *H04N 9/045* (2013.01); *H04N 9/77* (2013.01)

(58) Field of Classification Search
CPC ...... H04N 1/484; H04N 5/23229; H04N 9/73; H04N 9/735; H04N 9/77; H04N 9/045
See application file for complete search history.

(56) References Cited

U.S. PATENT DOCUMENTS 10,531,060 B2 *   1/2020   Zhuang ............... H04N 17/002
2008/0143845 A1   6/2008   Miki et al.
2019/0230253 A1 * 7/2019   Nikhara ................ H04N 1/628

FOREIGN PATENT DOCUMENTS

CN    101222572 A    7/2008
CN    101521826 A    9/2009
(Continued)

OTHER PUBLICATIONS

SIPO First Office Action corresponding to Application No. 201810140911.2; dated Mar. 14, 2019.

Primary Examiner — Daniel M Pasiewicz
(74) Attorney, Agent, or Firm — Cantor Colburn LLP

(57) ABSTRACT

A white balance parameter determination method and white balance adjustment method, device, and storage medium, the parameter determination method including: obtaining raw images captured by a camera device in each of a set of color temperature categories; calculating a red average value (Ravg) and a blue average value (Bavg) of each raw image; determining a red adjustment value according to a first difference value between the Ravg of each raw image and a Ravg of a golden set and determining a blue adjustment value according to a second difference value between the Bavg of each raw image and a Bavg of the golden set; and determining a final red adjustment value using the red adjustment value and a preset red adjustment value in a preset parameter table and determining a final blue adjustment value using the blue adjustment value and a preset blue adjustment value in the preset parameter table.

21 Claims, 6 Drawing Sheets

(51) Int. Cl.
*H04N 5/232* (2006.01)
*H04N 9/77* (2006.01)

(56) References Cited

FOREIGN PATENT DOCUMENTS

| | | |
|---|---|---|
| CN | 103093737 A | 5/2013 |
| CN | 105245864 A | 1/2016 |
| CN | 105306913 A | 2/2016 |
| CN | 105578166 A | 5/2016 |
| JP | 2004120096 A | 4/2004 |
| JP | 2007274124 A | 10/2007 |
| KR | 20070119931 A | 12/2007 |

\* cited by examiner

WHITE BALANCE PARAMETER DETERMINATION METHOD AND WHITE BALANCE ADJUSTMENT METHOD, DEVICE, AND STORAGE MEDIUM THEREOF

CROSS REFERENCE TO RELATED APPLICATION

This disclosure claims the benefits, of priority to Chinese Application No. 201810140911.2, filed on Feb. 9, 2018, which is incorporated herein by reference in its entirety.

TECHNICAL FIELD

The present disclosure relates to the field of image processing technology, and more particularly to a white balance parameter determination method and white balance adjustment method and device, and storage medium and terminal thereof.

BACKGROUND

In general, the color of light reflected by an object is influenced by the color of the light source. The human brain is able to detect and correct such variations in color. The human eye adapts to color changes in sunny and hazy weather and under indoor incandescent or fluorescent lighting so that the color of white-colored objects remains consistent. However, the color of white colored objects produced by digital image obtaining devices is not exactly the same in different light sources. For example, a picture captured in an environment illuminated by a tungsten filament lamp may be yellowish, while a picture captured in another environment may be bluish or reddish. In order to approximate human visual perception, a digital image obtaining device adjusts color on the basis of light rays and defines what white is so that the device can reproduce what human eyes see as white in the final image. This adjustment is referred to as white balance.

In currently available technology, the parameters for white balance correction, automatic white balance (AWB), and white balance ratio (WB ratio) all affect the adjusted colors. White balance correction makes adjustments according to the red average value and blue average value (Ravg, Bavg) of a device itself, AWB makes adjustments according to different gains associated with environmental changes, and WB ratio makes adjustments according to different color temperatures and brightness levels.

However, only one set of parameters is used when white balance adjustment is performed using currently available technology. When there exists a significant difference between the hardware of different devices, the color representation of the different devices will vary significantly in the same environment. For example, in the same scenario, images provided by one device may be reddish while images provided by another device may be bluish. Using a single set of parameters to perform white balance adjustment may result in inaccurate white balance correction, which could affect imaging results.

SUMMARY

In accordance with the present disclosure, there is provided a white balance parameter determination method which includes:

obtaining raw images captured by a camera device in each of a set of color temperature categories, each color temperature category having a different color temperature value range;

calculating a red average value (Ravg) and a blue average value (Bavg) of each raw image, with a green average value (Gavg) of each raw image being a preset value;

in each color temperature category, determining a red adjustment value according to a first difference value between the Ravg of each raw image and a Ravg of a golden set and determining a blue adjustment value according to a second difference value between the Bavg of each raw image and a Bavg of the golden set; and in each color temperature category, determining a final red adjustment value using the red adjustment value and a preset red adjustment value in a preset parameter table and determining a final blue adjustment value using the blue adjustment value and a preset blue adjustment value in the preset parameter table, the final red adjustment value and final blue adjustment value in each color temperature category forming a final parameter table to be used for white balance adjustment.

In accordance with the present disclosure, there is also provided a white balance adjustment method including:

obtaining raw images captured by a camera device in each of a set of color temperature categories, each color temperature category having a different color temperature value range;

calculating a red average value (Ravg) and a blue average value (Bavg) of each raw image, with a green average value (Gavg) of each raw image being a preset value;

in each color temperature category, determining a red adjustment value according to a first difference value between the Ravg of each raw image and a Ravg of a golden set and determining a blue adjustment value according to a second difference value between the Bavg of each raw image and a Bavg of the golden set; and in each color temperature category, determining a final red adjustment value using the red adjustment value and a preset red adjustment value in a preset parameter table and determining a final blue adjustment value using the blue adjustment value and a preset blue adjustment value in the preset parameter table, the final red adjustment value and final blue adjustment value in each color temperature category forming a final parameter table to be used for white balance adjustment;

obtaining an image to be adjusted with the camera device and a color temperature of a light source under which the image to be adjusted was captured;

determining the color temperature category to which the color temperature of the light source belongs and looking up in the final parameter table the final red adjustment value and the final blue adjustment value in the color temperature category; and adjusting a red component and a blue component of each pixel in the image to be adjusted using the final red adjustment value and the final blue adjustment value.

In accordance with the present disclosure, there is also provided a white balance adjustment device including:

a processor; and a memory storage device storing instructions executable by the processor to:

obtain raw images captured by a camera device in each of a set of color temperature categories, each color temperature category having a different color temperature value range;

calculate a red average value (Ravg) and a blue average value (Bavg) of each raw image, with a green average value (Gavg) of each raw image being a preset value;

determine, in each color temperature category, a red adjustment value according to a first difference value between the Ravg of each raw image and a Ravg of a golden set and determining a blue adjustment value according to a second difference value between the Bavg of each raw image and a Bavg of the golden set; and determine, in each color temperature category, a final red adjustment value using the red adjustment value and a preset red adjustment value in a preset parameter table and determining a final blue adjustment value using the blue adjustment value and a preset blue adjustment value in the preset parameter table, the final red adjustment value and final blue adjustment value in each color temperature category forming a final parameter table to be used for white balance adjustment.

In accordance with the present disclosure, there is also provided a non-transitory computer-readable storage medium on which a computer instruction is stored, and steps of the white balance parameter determination method or the steps of the white balance adjustment method are performed when the computer instruction is executed.

In accordance with the present disclosure, there is also provided discloses a terminal including a storage device and a processor, and the storage device stores computer instructions that may be run on the processor. The steps of the white balance parameter determination method or the steps of the white balance adjustment method are performed when the processor executes the computer instructions.

DETAILED DESCRIPTION

Figure 1:
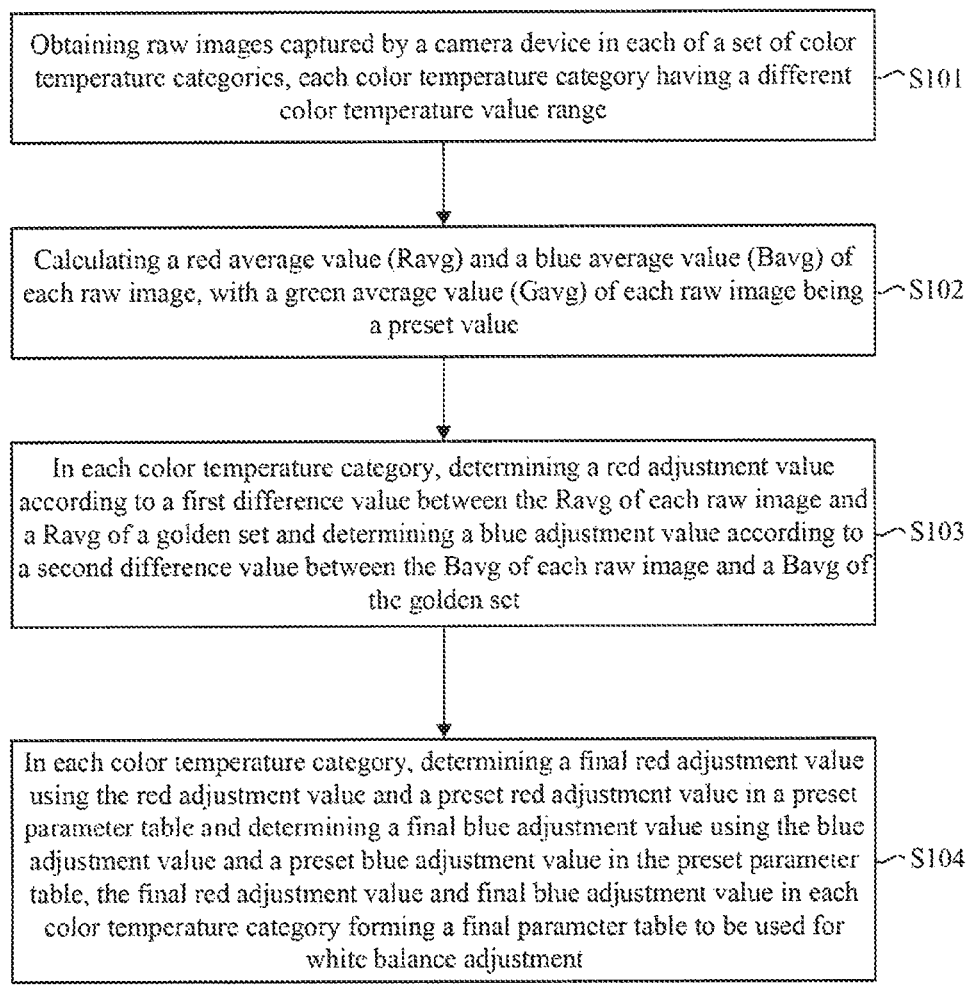
FIG. 1 is a flowchart illustrating a white balance parameter determination method, according to an embodiment of the present disclosure.

The present disclosure addresses the technical problem of obtaining white balance parameters to achieve consistency with respect to the color representation of white balanced devices.

As described in the Background section above, only one set of parameters is used when white balance adjustment is performed using currently available technology. When there exists a significant difference between the hardware of different devices, the color representation of the different devices may vary significantly in the same environment. For example, in the same scenario, images provided by one device may be reddish while images provided by another device may be bluish. Using a single set of parameters to perform white balance adjustment may result in inaccurate white balance correction, which could affect imaging results.

At low color temperatures (e.g. 2850K), the red average value (Ravg) and blue average value (Bavg) of an image captured by different devices differ from the Ravg and Bavg of the image captured by a golden set. In the present example embodiment, the golden set may refer to a device in which the numerical values of the Ravg and the Bavg fall at the median among a plurality of devices manufactured using the same manufacturing processes and conditions as the camera device.

Table 1 shows the Ravg and Bavg of a device Set1, a device Set2, and a golden set. As shown in Table 1, the difference value between the device Set1 and the golden set is −418 with respect to the Ravg and 3 with respect to the Bavg. The difference value between the device Set2 and the golden set is 594 with respect to the Ravg and −60 with respect to the Bavg.

TABLE 1

| Device | Numerical value | |
| --- | --- | --- |
| | Ravg | Bavg |
| Set1 | 2831 | 1349 |
| Golden set | 3249 | 1346 |
| Set2 | 3843 | 1286 |

As shown in the aforementioned data, the red components of the image captured by the device Set1 are smaller, and the red components of the image captured by the device Set2 are larger. In actual testing, the appearance of images captured by the device Set1 was markedly bluish and the appearance of images captured by the device Set2 was markedly reddish in comparison with the golden set in the same low color temperature scenario.

Table 2 shows the Ravg and Bavg of an image captured by a device Set3 and the Ravg and Bavg of the image captured by a golden set at high color temperatures (e.g. 5000K). The difference value between the Ravg of the device Set3 and the Ravg of the golden set is 51, and the difference value of the Bavg values is −49. In actual testing, the appearance of images captured by the device Set3 was markedly reddish.

TABLE 2

| Device | Numerical value | |
| --- | --- | --- |
| | Ravg | Bavg |
| Golden set | 2255 | 2107 |
| Set3 | 2306 | 2058 |

Therefore, the color cast of an image captured by a camera device is related to the difference value with respect to each color component between the image captured by the camera device and the image captured by the golden set.

A preset parameter table is configured on the basis of a golden set. Therefore, the technical solution provided by the present disclosure adjusts each adjustment value in the preset parameter table using the difference between a particular camera device and the golden set with respect to the Ravg and Bavg to obtain a final parameter table applicable to the particular camera device. Using the final parameter table to perform white balance on the camera device may increase the accuracy of white balance adjustment and achieve consistency with respect to the color representation of white balanced devices in the same scenario.

In order to make the aforementioned purposes, characteristics, and benefits of the present disclosure more evident and easier to understand, detailed descriptions of specific example embodiments of the present disclosure are provided below with reference to the attached drawings.

FIG. 1 is a flowchart illustrating a white balance parameter determination method according to an embodiment of the present disclosure.

The white balance parameter determination method includes the following steps:

Step S101: obtaining raw images captured by a camera device in each of a set of color temperature categories, each color temperature category having a different color temperature value range;

Step S102: calculating a red average value (Ravg) and a blue average value (Bavg) of each raw image, with a green average value (Gavg) of each raw image being a preset value;

Step S103: in each color temperature category, determining a red adjustment value according to a first difference value between the Ravg of each raw image and a Ravg of a golden set and determining a blue adjustment value according to a second difference value between the Bavg of each raw image and a Bavg of the golden set; and Step S104: in each color temperature category, determining a final red adjustment value using the red adjustment value and a preset red adjustment value in a preset parameter table and determining a final blue adjustment value using the blue adjustment value and a preset blue adjustment value in the preset parameter table, the final red adjustment value and final blue adjustment value in each color temperature category forming a final parameter table to be used for white balance adjustment.

The white balance parameter determination method of the present example embodiment may determine the final parameter table for the camera device at each color temperature. The final parameter table may be used to perform white balance adjustment on images captured by the camera device.

In one specific embodiment of Step S101, the color temperature categories may comprise low color temperatures, medium color temperatures, and high color temperatures. Here, low color temperatures refer to color temperatures below 2850K, high color temperatures refer to color temperatures above 5000K, and medium color temperatures are between 2850K and 5000K. Other color temperature categories or other color temperature value ranges may also be configured as needed in actual application scenarios. No limitation in this respect is imposed by example embodiments of the present disclosure.

The same camera device may have different color representations at different color temperatures. Therefore, raw images captured by the camera device in different color temperature categories may be obtained to be used for determining the final parameter table.

Since the red component, blue component, and green component of a white point in a white balance adjusted image are identical, the Gavg of the raw image may be configured to be the preset value. Thus, only the red component and blue component need to be adjusted, and only the adjustment values with respect to the red component and the blue component need to be calculated. This may reduce the computational load. Then, in one specific embodiment of Step S102, the Ravg and Bavg of each raw image are calculated separately.

As described above, the color cast of an image captured by a camera device is related to the difference value with respect to each color component between the image captured by the camera device and the image captured by the golden set. Hence, in one specific embodiment of Step S103, the red adjustment value may be determined according to a first difference between the Ravg of the raw image and the Ravg of the golden set, and the blue adjustment value may be determined according to a second difference between the Bavg of the raw image and the Bavg of the golden set. Here, the Ravg and Bavg of the golden set may be obtained through calculation in advance.

Specifically, when the red adjustment value is being determined, the sign of the red adjustment value may be determined according to the sign of the first difference value between the Ravg of the raw image and the Ravg of the golden set, and the magnitude of the red adjustment value may be determined according to the magnitude of the absolute value of the first difference value. The sign of the red adjustment value is opposite to the sign of the first difference value, and the red adjustment value correlates positively with the absolute value of the first difference value. For example, when the first difference value between the Ravg of the raw image and the Ravg of the golden set is −65, the sign of the red adjustment value is "+" and the magnitude of the red adjustment value is a certain multiple of 65.

Similarly, when the blue adjustment value is being determined, the sign of the blue adjustment value may be determined according to the sign of the second difference value between the Bavg of the raw image and the Bavg of the golden set, and the magnitude of the blue adjustment value may be determined according to the magnitude of the absolute value of the second difference value. The sign of the blue adjustment value is opposite to the sign of the second difference value, and the blue adjustment value correlates positively with the absolute value of the second difference value.

Then, in one specific embodiment of Step S104, a preset red adjustment value and a preset blue adjustment value in the preset parameter table may be adjusted using the red adjustment value and the blue adjustment value to obtain the final red adjustment value and the final blue adjustment value. Specifically, in each color temperature category, the final red adjustment value may be the sum of the preset red adjustment value and the red adjustment value, and the final blue adjustment value may be the sum of the preset blue adjustment value and the blue adjustment value.

Tables 3-5 below show example values used in Steps S101-S104 at a low color temperature, a medium color temperature, and a high color temperature. Table 3 shows possible preset red adjustment values and preset blue adjustment values. Table 4 shows possible red adjustment values and blue adjustment values. Table 5 shows possible final red adjustment values and final blue adjustment values.

TABLE 3

| Low color temperature | | Medium color temperature | | High color temperature | |
| --- | --- | --- | --- | --- | --- |
| Preset red adjustment value | Preset blue adjustment value | Preset red adjustment value | Preset blue adjustment value | Preset red adjustment value | Preset blue adjustment value |
| 4500 | 3775 | 4050 | 4040 | 4050 | 4040 |

TABLE 4

| Low color temperature | | Medium color temperature | | High color temperature | |
| --- | --- | --- | --- | --- | --- |
| Red adjustment value | Blue adjustment value | Red adjustment value | Blue adjustment value | Red adjustment value | Blue adjustment value |
| −300 | 225 | 0 | 0 | −20 | 20 |

TABLE 5

| Low color temperature | | Medium color temperature | | High color temperature | |
| --- | --- | --- | --- | --- | --- |
| Final red adjustment value | Final blue adjustment value | Final red adjustment value | Final blue adjustment value | Final red adjustment value | Final blue adjustment value |
| 4200 | 4000 | 4050 | 4040 | 4030 | 4060 |

Different camera devices may exhibit inconsistent color casts only in a certain color temperature category. For example, the color casts of device Set1 and the device Set2 may be inconsistent only at low color temperatures. Therefore, the final red adjustment value and final blue adjustment value for device Set1 and device Set2 may need to be calculated only in the low color temperature category. The preset red adjustment value and preset blue adjustment value in the preset parameter table may continue to be used for the final red adjustment value and final blue adjustment value for device Set1 and device Set2 at medium color temperatures and high color temperatures.

Table 5 shows a final parameter table according to an embodiment of the present disclosure. The final parameter table has a single dimension, i.e., "color temperature category." The color temperature category values include low color temperature, medium color temperature, and high color temperature. Final red adjustment values and final blue adjustment values correspond to the color temperature categories.

According to an embodiment of the present disclosure, each adjustment value in the preset parameter table may be adjusted using the differences in Ravg and Bavg values between the camera device and the golden set to obtain a final parameter table applicable to a particular camera device. Using the final parameter table to perform white balance on the camera device may increase the accuracy of white balance adjustment and achieve consistency with respect to the color representation of white balanced devices in the same scenario.

One specific embodiment of Step S103 illustrated in FIG. 1, in each color temperature category, said red adjustment value is determined according to a first difference value between the Ravg of said raw image and the Ravg of said golden set, and said blue adjustment value is determined according to a second difference value between the Bavg of said raw image and the Bavg of said golden set.

Specifically, the direction of the red adjustment value is determined according to the direction of the first difference value, and the magnitude of the red adjustment value is determined according to the magnitude of the absolute value of said first difference value. The direction of the red adjustment value is opposite to the direction of said first difference value, and the red adjustment value correlates positively with said first difference value.

Similarly, the direction of the blue adjustment value is determined according to the direction of the second difference value, and the magnitude of the blue adjustment value is determined according to the magnitude of the absolute value of said second difference value. The direction of the blue adjustment value is opposite to the direction of said second difference value, and the blue adjustment value correlates positively with the absolute value of said second difference value.

In one example embodiment of the present disclosure, if the color temperature of a light source in a color temperature category is less than a first preset value, then the red adjustment value is determined according to a product of a first preset coefficient and the first difference value and the blue adjustment value is determined according to a product of a second preset coefficient and the second difference value. The second preset coefficient may be greater than the first preset coefficient.

In the present example embodiment, the first preset value may be 2850K. In other words, when the color temperature category is low color temperatures, the Ravg is generally higher than the Bavg and the first difference value is higher than the second difference value. Therefore, in order to cause the red adjustment value and blue adjustment value to be consistent, the second preset coefficient may be greater than the first preset coefficient to ensure that no color cast is present in a white point during white balance adjustment.

Further, if the color temperature of a light source in the color temperature category is less than a first preset value and the first difference value is less than a preset threshold, then the product of the first difference value and a first subcoefficient is calculated to be the red adjustment value. If the color temperature of a light source in the color temperature category is less than the first preset value and the first difference value is greater than or equal to the preset threshold, then a product of the first difference value and a second subcoefficient is calculated to be the red adjustment value. The first subcoefficient may be greater than the second subcoefficient.

In the present example embodiment, with respect to the Ravg, different magnitudes of the first difference value result in different degrees of red component color cast when the color temperature category is low color temperatures. Therefore, two different methods of calculation are used to determine the red adjustment value when the first difference value is less than the preset threshold and when the first difference value is greater than or equal to the preset threshold, respectively.

Specifically, when the first difference value is relatively small (i.e., when the first difference value is less than the preset threshold), the degree of color cast is relatively large. When the first difference value is relatively large (i.e., when the first difference value is greater than or equal to the preset threshold), the degree of color cast is relatively small. Therefore, a red adjustment value for a relatively small first difference value needs to be greater than a red adjustment value for a relatively large first difference value. Thus, the first subcoefficient is greater than the second subcoefficient.

In another application scenario of the present disclosure, the red adjustment value may be calculated according to:

$$\begin{cases} r = 2x/3; \, 0 \le x < 300 \\ r = x/3 + 100; \, x \ge 300 \end{cases}$$

where r represents the red adjustment value and x represents the first difference value; and the blue adjustment value may be calculated according to:

$$b = 10y/3$$

where b represents the blue adjustment value and y represents the second difference value.

Figure 2:
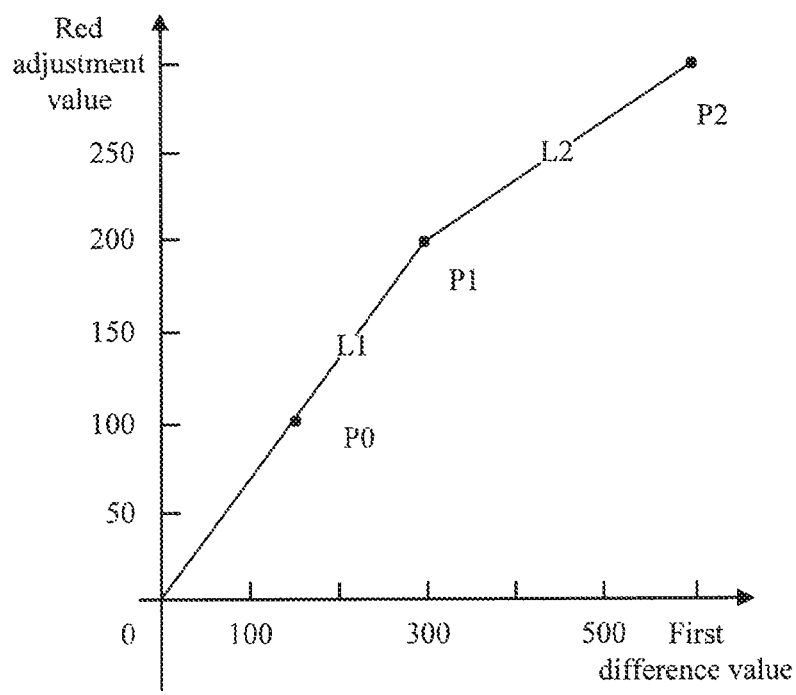
FIG. 2 is a diagram illustrating a specific application scenario, according to an embodiment of the present disclosure.

FIG. 2 is a diagram illustrating a specific application scenario, according to an embodiment of the present disclosure. More particularly, the horizontal axis of the coordinate system illustrated in FIG. 2 represents the first difference value, and the vertical axis of the coordinate system represents the red adjustment value. Curve L1 and curve L2 represent the relationship between the red adjustment value and the first difference value in a low color temperature scenario. Curve L1 and curve L2 may be found by determining at least two points.

In the present example embodiment, the preset value of the Gavg is 4096, and the preset threshold is 300. At point P0 of FIG. 2, the difference between the Ravg of the camera device and the Ravg of the golden set is 150, and the magnitude of the red adjustment value is 100 (the sign of the red adjustment value may be to increase or to decrease). At point P1, the difference between the Ravg of the camera device and the Ravg of the golden set is 300, and the magnitude of the red adjustment value is 200. At point P2, the difference between the Ravg of the camera device and the Ravg of the golden set is 600, and the magnitude of the red adjustment value is 300. Curve L1 and curve L2 therefore may be expressed as:

$$\begin{cases} L1: r = 2x/3, \, 0 \le x < 300 \\ L2: r = x/3 + 100, \, x \ge 300 \end{cases}$$

Figure 3:
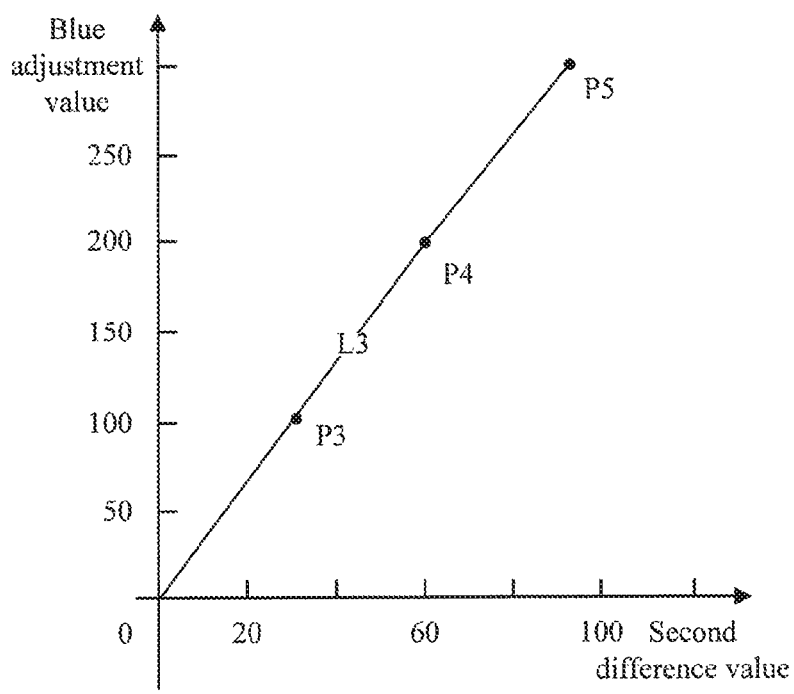
FIG. 3 is a diagram illustrating another specific application scenario, according to an embodiment of the present disclosure.

FIG. 3 is a diagram illustrating another specific application scenario, according to an embodiment of the present disclosure. More particularly, the horizontal axis of the coordinate system represents the second difference value, and the vertical axis of the coordinate system represents the blue adjustment value. Curve L3 illustrated in FIG. 3 represents the relationship between the blue adjustment value and the second difference value in a low color temperature scenario. Curve L3 may be found by determining at least two points.

In the present example embodiment, the preset value of the Gavg is 4096. At point P3, the difference between the Bavg of the camera device and the Bavg of the golden set is 30, and the magnitude of the blue adjustment value is 100. At point P4, the difference between the Bavg of the camera device and the Bavg of the golden set is 60, and the magnitude of the blue adjustment value is 200. At point P5, the difference between the Bavg of the camera device and the Bavg of the golden set is 90, and the magnitude of the blue adjustment value is 300. Curve L3 therefore may be expressed as:

$$b = 10y/3$$

In another example embodiment of the present disclosure, Step S103 illustrated in FIG. 1 may include the following steps: if a color temperature of a light source in a color temperature category is greater than a second preset value, then the red adjustment value is determined according to a product of a third preset coefficient and the first difference value and the blue adjustment value is determined according to a product of a third preset coefficient and the second difference value.

In the present example embodiment, the second preset value may be equal to the first preset value. In other words, in medium color temperature and high color temperature scenarios, the degree of color cast is consistent with respect to the red component and the blue component for the camera device and for the golden set. Therefore, the same third preset coefficient may be used to determine the red adjustment value and blue adjustment value.

Figure 4:
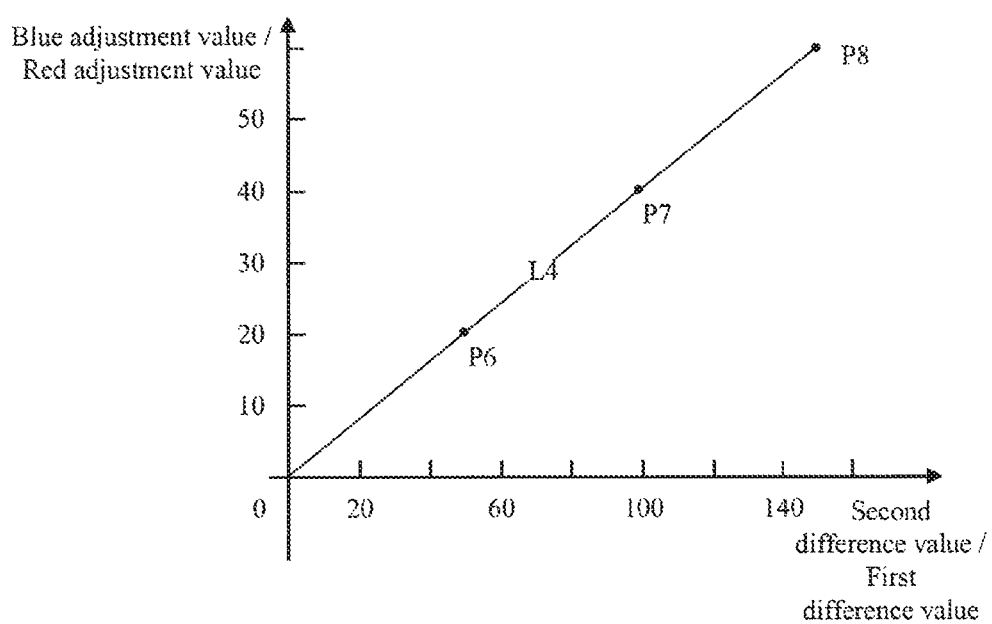
FIG. 4 is a diagram illustrating still another specific application scenario, according to an embodiment of the present disclosure.

FIG. 4 is a diagram illustrating another application scenario, according to an embodiment of the present disclosure. More particularly, the horizontal axis of the coordinate system represents the second difference value or the first difference value, and the vertical axis of the coordinate system represents the blue adjustment value or the red adjustment value. Curve L4 illustrated in FIG. 4 represents the relationship between the blue adjustment value and the second difference value, or the relationship between the red adjustment value and the first difference value, in a medium color temperature or high color temperature scenario. Curve L4 may be found by determining at least two points.

Specifically, the Ravg of the camera device in a medium color temperature or high color temperature scenario may be less than the Ravg of the camera device in a low color temperature scenario, and the Ravg in a medium color temperature or high color temperature scenario may be set relatively small. Therefore, the red adjustment value may also be relatively small. For every increase of 50 in the first difference value or second difference value, the magnitude of the red adjustment value or blue adjustment value may increase by 20, i.e., corresponding to point P6 (50, 20), point P7 (100, 40), and point P8 (150, 60) in FIG. 4. Curve L4 therefore may be expressed as:

r=2x/5 or b=2y/5 where r represents the red adjustment value, x represents the first difference value, b represents the blue adjustment value, and y represents the second difference value.

In still another example embodiment of the present disclosure, the final parameter table may comprise a brightness dimension with a plurality of brightness levels. The final parameter table may further comprise a final red adjustment value and a final blue adjustment value in each color temperature category and at each of the plurality of brightness levels.

In the present example embodiment, the final parameter table may have two dimensions, i.e., a brightness and a color temperature category. When the final parameter table is used, an applicable final red adjustment value and an applicable final blue adjustment value may be looked up according to the color temperature category and brightness of a captured image. The brightness may represent the brightness of the environment. Specifically, the brightness may be an exposure value. Greater exposure values correspond to lower brightness and darker environments.

Table 6 shows a final parameter table in still another application scenario of the present disclosure. Here, greater index values 0, 1, 2, . . . , N correspond to lower brightness and darker environments.

TABLE 6

| | Brightness | | | | | |
|---|---|---|---|---|---|---|
| | Low color temperature | | Medium color temperature | | High color temperature | |
| | Final red adjustment value | Final blue adjustment value | Final red adjustment value | Final blue adjustment value | Final red adjustment value | Final blue adjustment value |
| Index 0 | 4200 | 4000 | 4050 | 4040 | 4030 | 4060 |
| Index 1 | 4200 | 4000 | 4050 | 4040 | 4030 | 4060 |
| Index 2 | 4200 | 4000 | 4050 | 4040 | 4030 | 4060 |
| Index 3 | 4200 | 4000 | 4050 | 4040 | 4030 | 4060 |
| Index 4 | 4200 | 4000 | 4050 | 4040 | 4030 | 4060 |
| Index 5 | 4200 | 4000 | 4050 | 4040 | 4030 | 4060 |
| Index 6 | 4200 | 4000 | 4050 | 4040 | 4030 | 4060 |
| Index 7 | 4200 | 4000 | 4050 | 4040 | 4030 | 4060 |
| . . . | . . . | . . . | . . . | . . . | . . . | . . . |
| Index N | 4200 | 3875 | 4096 | 4096 | 4076 | 5116 |

Figure 5:
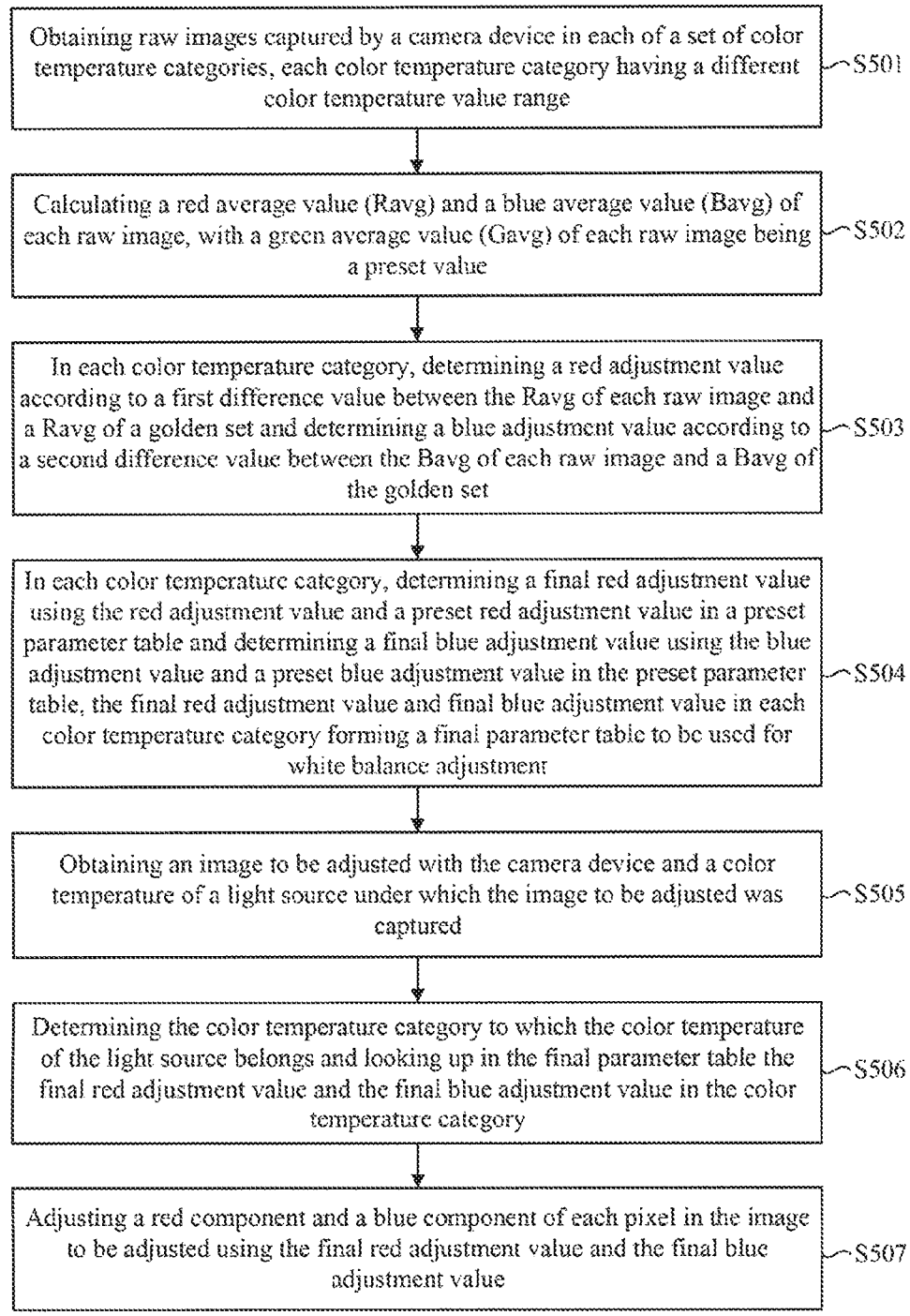
FIG. 5 is a flowchart illustrating a white balance adjustment method, according to an embodiment of the present disclosure.

FIG. 5 is a flowchart illustrating a white balance adjustment method. The white balance adjustment method includes the following steps:

Step S501: obtaining raw images captured by a camera device in each of a set of color temperature categories, each color temperature category having a different color temperature value range;

Step S502: calculating a red average value (Ravg) and a blue average value (Bavg) of each raw image, with a green average value (Gavg) of each raw image being a preset value;

Step S503: in each color temperature category, determining a red adjustment value according to a first difference value between the Ravg of each raw image and a Ravg of a golden set and determining a blue adjustment value according to a second difference value between the Bavg of each raw image and a Bavg of the golden set;

Step S504: in each color temperature category, determining a final red adjustment value using the red adjustment value and a preset red adjustment value in a preset parameter table and determining a final blue adjustment value using the blue adjustment value and a preset blue adjustment value in the preset parameter table, the final red adjustment value and final blue adjustment value in each color temperature category forming a final parameter table to be used for white balance adjustment;

Step S505: obtaining an image to be adjusted with the camera device and a color temperature of a light source under which the image to be adjusted was captured;

Step S506: determining the color temperature category to which the color temperature of the light source belongs and looking up in the final parameter table the final red adjustment value and the final blue adjustment value in the color temperature category; and Step S507: adjusting a red component and a blue component of each pixel in the image to be adjusted using the final red adjustment value and the final blue adjustment value.

In the present example embodiment, after the final parameter table has been determined on the basis of the white balance parameter determination method of steps S501-S504, the final parameter table may be stored on a camera device. When white balance adjustment is performed, the final parameter table may be directly retrieved.

Alternatively, when white balance adjustment is performed, each step of the white balance parameter determination method illustrated in FIG. 1 may be performed to obtain the final parameter table.

In one specific embodiment of Step S505 and Step S506, the nature of color cast of a camera device differs in different color temperature categories. Therefore, the color temperature category corresponding to the image to be adjusted may be determined according to the color temperature of the light source under which the image to be adjusted was captured by the camera device. The final red adjustment value and the final blue adjustment value in the color temperature category are looked up in the final parameter table.

Then, in Step S507, the image to be adjusted may be adjusted using the final red adjustment value and the final blue adjustment value. Specifically, the red component of each pixel in the image to be adjusted may be adjusted using the final red adjustment value, and the blue component of each pixel in the image to be adjusted may be adjusted using the final blue adjustment value.

In one specific embodiment of Step S506, a brightness of the image to be adjusted is obtained. The final parameter table includes a brightness dimension having a plurality of brightness levels, and the final red adjustment value and the final blue adjustment value corresponding to each color temperature category and each of the plurality of brightness levels. The final red adjustment value and final blue adjustment value in the color temperature category and brightness level corresponding to the color temperature of the light source and brightness of the image to be adjusted are looked up in the final parameter table.

In the present example embodiment, to increase the precision of the white balance adjustment for the image to be adjusted, the final blue adjustment value and the final red adjustment value may be determined according to both the brightness and color temperature category of the image to be adjusted.

In one specific embodiment of Step S507, a first product of the final red adjustment value and a red component of each pixel is calculated, and a quotient of the first product and the preset value is calculated to be an adjusted red component of each pixel. A second product of the final blue adjustment value and a blue component of each pixel is calculated, and a quotient of the second product and the preset value is calculated to be an adjusted blue component of each pixel.

In the present example embodiment, the preset value may be 4096. The red component and blue component of each white balanced pixel may be obtained by performing weighting on the red component of each pixel using the quotient of the final red adjustment value and the preset value and performing weighting on the blue component of each pixel using the quotient of the final blue adjustment value and the preset value.

Figure 6:
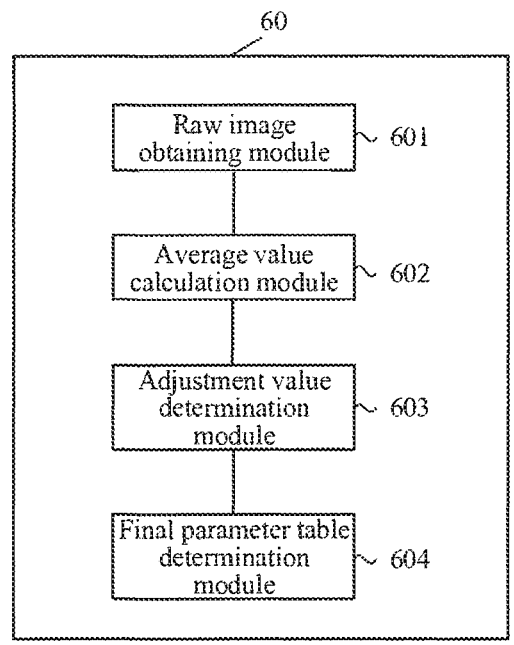
FIG. 6 is a structural diagram illustrating a white balance adjustment device, according to an embodiment of the present disclosure.

FIG. 6 is a structural diagram illustrating a white balance adjustment device 60. The device includes a raw image obtaining module 601, an average value calculation module 602, an adjustment value determination module 603, and a final parameter table determination module 604.

Here, the raw image obtaining module 601 is adapted to obtain raw images captured by a camera device in each of a set of color temperature categories, each color temperature category having a different color temperature value range. The average value calculation module 602 is adapted to calculate a red average value (Ravg) and a blue average value (Bavg) of each raw image, with a green average value (Gavg) of each raw image being a preset value. The adjustment value determination module 603 is adapted to determine a red adjustment value according to a first difference value between the Ravg of each raw image and a Ravg of a golden set and to determine a blue adjustment value according to a second difference value between the Bavg of each raw image and a Bavg of the golden set. The final parameter table determination module 604 is adapted to determine, in each color temperature category, a final red adjustment value using the red adjustment value and a preset red adjustment value in a preset parameter table and determining a final blue adjustment value using the blue adjustment value and a preset blue adjustment value in the preset parameter table, the final red adjustment value and final blue adjustment value in each color temperature category forming a final parameter table to be used for white balance adjustment.

In this example embodiment of the present disclosure, each adjustment value in the preset parameter table is adjusted using the differences between the camera device and the golden set with respect to the Ravg and Bavg to obtain a final parameter table applicable to the camera device. Using the final parameter table to perform white balance on the camera device may increase the accuracy of white balance adjustment and achieve consistency with respect to the color representation of white balanced devices in the same scenario.

Further, the adjustment value determination module 603 is adapted to determine, in each color temperature category, the red adjustment value according to a first difference value between the Ravg of the raw image and the Ravg of the golden set and the blue adjustment value according to a second difference value between the Bavg of the raw image and the Bavg of the golden set.

Figure 7:
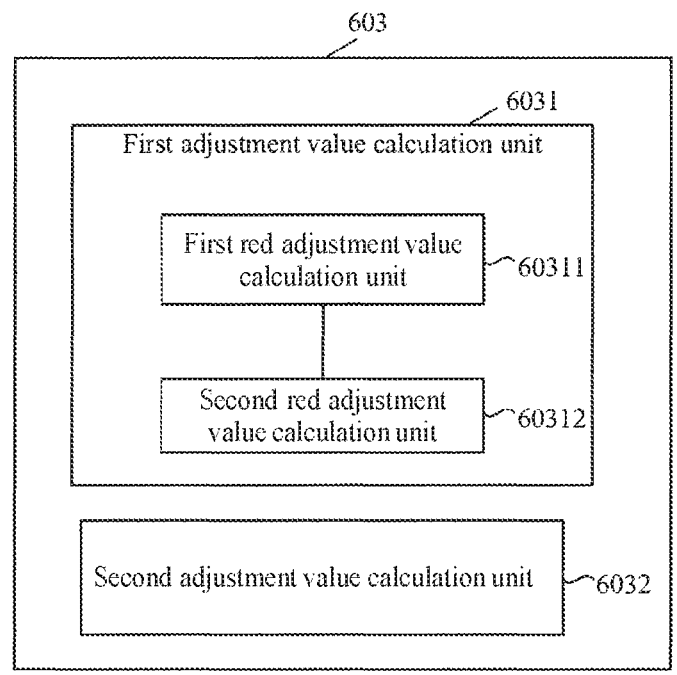
FIG. 7 is a detailed structural diagram illustrating an adjustment value determination module illustrated in FIG. 6.

FIG. 7 is a structural diagram further illustrating the adjustment value determination module 603. The module includes a first adjustment value calculation unit 6031 and a second adjustment value calculation unit 6032. The first adjustment value calculation unit further includes a first red adjustment value calculation unit 60311 and a second red adjustment value calculation unit 60312.

In one example embodiment of the present disclosure, the adjustment value determination module 603 may comprise: a first adjustment value calculation unit 6031 adapted to determine, when the color temperature of a light source in the color temperature category is less than a first preset value, the red adjustment value according to a product of a first preset coefficient and the first difference value and determining the blue adjustment value according to a product of a second preset coefficient and the second difference value. In this embodiment, the second preset coefficient is greater than the first preset coefficient.

Further, the first adjustment value calculation unit 6031 may comprise a first red adjustment value calculation unit 60311 adapted to calculate, when the first difference value is less than a preset threshold, the product of the first difference value and a first subcoefficient to be the red adjustment value; and a second red adjustment value calculation unit 60312 adapted to calculate, when the first difference value is greater than or equal to the preset threshold, the product of the first difference value and a second subcoefficient to be the red adjustment value. In this embodiment, the first subcoefficient is greater than the second subcoefficient.

In this example embodiment of the present disclosure, in comparison with the degree of color cast when the first difference value is relatively small, the degree of color cast is relatively small when the first difference value is relatively large. Therefore, the second subcoefficient used when the first difference value is relatively large is less than the first subcoefficient used when the first difference value is relatively small, thereby ensuring overall color consistency during white balance adjustment.

Specifically, the first adjustment value calculation unit 6031 may calculate the red adjustment value using the following formula:

$$\begin{cases} r = 2x/3, \ 0 \le x < 300 \\ r = x/3 + 100, \ x \ge 300 \end{cases}$$

where r represents the red adjustment value and x represents the first difference value; and the first adjustment value calculation unit 6031 may calculate the blue adjustment value using the following formula:

$$b = 10y/3$$

, where b represents the blue adjustment value and y represents the second difference value.

In another example embodiment of the present disclosure, the adjustment value determination module 603 may further comprise: a second adjustment value calculation unit 6032 adapted to determine, when the color temperature of a light source in the color temperature category is greater than a second preset value, the red adjustment value is determined according to a product of a third preset coefficient and the first difference value and the blue adjustment value is determined according to a product of a third preset coefficient and the second difference value.

Specifically, the second adjustment value calculation unit 6032 may calculate the red adjustment value or the blue adjustment value using the following formula:

r=2x/5 or b=2y/5, where r represents the red adjustment value, x represents the first difference value, b represents the blue adjustment value, and y represents the second difference value.

In still another example embodiment of the present disclosure, the final parameter table may comprise a brightness dimension with a plurality of brightness levels. The final parameter table may further comprise a final red adjustment value and a final blue adjustment value in each color temperature category and at each of the plurality of brightness levels.

Figure 8:
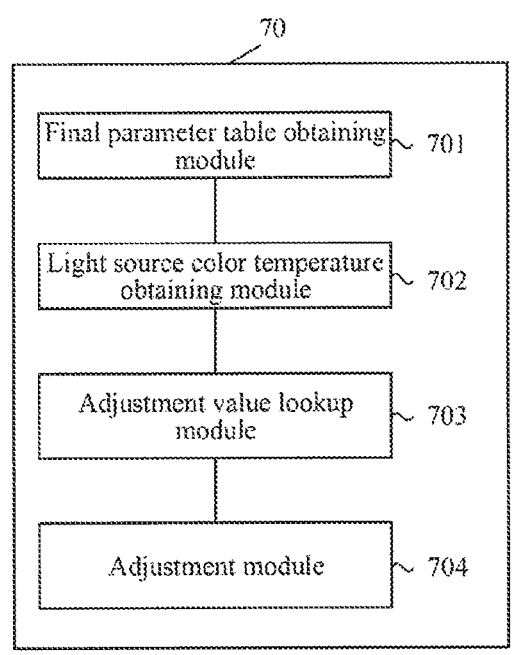
FIG. 8 is a structural diagram illustrating a white balance adjustment device, according to an embodiment of the present disclosure.

FIG. 8 is a structural diagram illustrating additional components of a white balance adjustment device 70. The device includes a final parameter table obtaining module 701, a light source color temperature obtaining module 702, an adjustment value lookup module 703, and an adjustment module 704.

Here, the final parameter table obtaining module 701 is adapted to obtain the final parameter table determined on the basis of the white balance parameter determination method. The light source color temperature obtaining module 702 is adapted to obtain an image to be adjusted with the camera device and a color temperature of a light source under which the image to be adjusted was captured; the adjustment value lookup module 703 is adapted to determine the color temperature category to which the color temperature of the light source belongs and look up in the final parameter table the final red adjustment value and the final blue adjustment value in the color temperature category; and the adjustment module 704 is adapted to adjust a red component and a blue component of each pixel in the image to be adjusted using the final red adjustment value and the final blue adjustment value.

In the present example embodiment, after the final parameter table has been determined on the basis of the white balance parameter determination method, the final parameter table may be stored on a camera device. When white balance adjustment needs to be performed, the final parameter table may be directly retrieved.

Alternatively, when white balance adjustment is performed, each step of the white balance parameter determination method illustrated in FIG. 1 may be performed to obtain the final parameter table.

In one specific example embodiment of the present disclosure, the adjustment value lookup module 703 may comprise a brightness obtaining unit adapted to obtain the brightness of the image to be adjusted; and a lookup unit adapted to look up in the final parameter table further comprises looking up the final red adjustment value and the final blue adjustment value in the color temperature category and brightness level corresponding to the color temperature of the light source and the brightness of the image to be adjusted.

In another specific example embodiment of the present disclosure, the adjustment module 704 may comprise a red component calculation unit adapted to calculate a first product of the final red adjustment value and a red component of each pixel, and calculating a quotient of the first product and the preset value to be an adjusted red component of each pixel; and a blue component calculation unit adapted to calculate a second product of the final blue adjustment value and a blue component of each pixel, and calculating a quotient of the second product and the preset value to be an adjusted blue component of each pixel.

One example embodiment of the present disclosure is a storage medium on which a computer instruction is stored. The steps of the white balance parameter determination method illustrated in FIG. 1 or the steps of the white balance adjustment method illustrated in FIG. 5 may be performed when the computer instructions are executed. The storage medium may comprise a ROM, a RAM, a magnetic disk, or an optical disc, etc. The storage medium may further comprise a non-volatile storage device or a non-transitory storage device, etc.

Another example embodiment of the present disclosure is a terminal comprising a storage device and a processor. The storage device stores a computer instruction that may be run on the processor. The steps of the white balance parameter determination method illustrated in FIG. 1 or the steps of the white balance adjustment method illustrated in FIG. 5 may be performed when the processor executes the computer instructions. The terminal may be, but is not limited to, a cell phone, a computer, a tablet computer, a video camera, or another terminal device.

In comparison with currently available technology, the technical solution provided by example embodiments of the present disclosure has a number of benefits. The technical solution provided by the present disclosure obtains a raw image captured by a camera device in each color temperature category, different color temperature categories having different color temperature value ranges. The Ravg and Bavg of each raw image is calculated, the green average value (Gavg) of the raw image being a preset value. In each color temperature category, a red adjustment value is determined according to the difference between the Ravg of the raw image and the Ravg of a golden set and determines a blue adjustment value according to the difference between the Bavg of the raw image and the Bavg of the golden set. In each color temperature category, a final red adjustment value is determined using the red adjustment value and a preset red adjustment value in a preset parameter table. A final blue adjustment value is also determined using the blue adjustment value and a preset blue adjustment value in the preset parameter table. The final red adjustment value and final blue adjustment value in each color temperature category form a final parameter table to be used for white balance adjustment. The preset parameter table is configured on the basis of a golden set. Therefore, the technical solution provided by the present disclosure adjusts each adjustment value in the preset parameter table using the difference between a camera device and the golden set with respect to the Ravg and Bavg to obtain a final parameter table applicable to the camera device. Using the final parameter table to perform white balance on the camera device may increase the accuracy of white balance adjustment and achieve consistency with respect to the color representation of white balanced devices in the same scenario.

Further, if the color temperature of a light source in the color temperature category is less than a first preset value, then the red adjustment value is determined according to the product of a first preset coefficient and the first difference value and the blue adjustment value is determined according to the product of a second preset coefficient and the second difference value, the second preset coefficient being greater than the first preset coefficient. In the technical solution provided by the present disclosure, at relatively low color temperatures, a camera device's Ravg is higher than its Bavg and the first difference value is higher than the second difference value. Therefore, when the red adjustment value and blue adjustment value are being determined, in order to obtain the same red adjustment value and blue adjustment value, the second preset coefficient is greater than the first preset coefficient, which may ensure the accuracy of the final parameter table and thereby ensure that the color difference after white balance has been performed is relatively small.

Further, if the first difference value is less than a preset threshold, then the product of the first difference value and a first subcoefficient is calculated to be the red adjustment value. If the first difference value is greater than or equal to the preset threshold, then the product of the first difference value and a second subcoefficient is calculated to be the red adjustment value, the first subcoefficient being greater than the second subcoefficient. In the technical solution provided by the present disclosure, in comparison with the degree of color cast when the first difference value is relatively small, the degree of color cast is relatively small when the first difference value is relatively large. Therefore, the second subcoefficient used when the first difference value is relatively large is less than the first subcoefficient used when the first difference value is relatively small, thereby ensuring overall color consistency during white balance adjustment.

Further, the final parameter table determined on the basis of the white balance parameter determination method, and an image to be adjusted and the color temperature of the light source under which the image to be adjusted was captured by the camera device are obtained. The color temperature category to which the light source color temperature belongs is determined, and the final red adjustment value and the final blue adjustment value in the color temperature category are looked up in the final parameter table. The red component and blue component of each pixel in the image to be adjusted are adjusted using the final red adjustment value and the final blue adjustment value. In the technical solution provided by the present disclosure, the final red adjustment value and final blue adjustment value in the final parameter table vary at different color temperature categories. Hence, the adjustment value used for white balance adjustment is determined on the basis of the color temperature of the light source under which the image to be adjusted was captured by the camera device. This may ensure the accuracy of white balance adjustment and the consistency of color representation for different white balanced camera devices.

Notwithstanding the above disclosure, the present claims are not limited thereby. Any person having ordinary skill in the art may make various alterations and changes that are not detached from the essence and scope of the disclosed embodiments; therefore, the scope of protection for the present disclosure should be that as defined by the claims.

What is claimed is:

1. A white balance parameter determination method, comprising:
    obtaining raw images captured by a camera device in each of a set of color temperature categories, each color temperature category having a different color temperature value range;
    calculating a red average value (Ravg) and a blue average value (Bavg) of each raw image, with a green average value (Gavg) of each raw image being a preset value;
    in each color temperature category, determining a red adjustment value according to a first difference value between the Ravg of each raw image and a Ravg of a golden set and determining a blue adjustment value according to a second difference value between the Bavg of each raw image and a Bavg of the golden set; and
    in each color temperature category, determining a final red adjustment value using the red adjustment value and a preset red adjustment value in a preset parameter table and determining a final blue adjustment value using the blue adjustment value and a preset blue adjustment value in the preset parameter table, the final red adjustment value and final blue adjustment value in each color temperature category forming a final parameter table to be used for white balance adjustment.

2. The white balance parameter determination method of claim 1, wherein determining the red adjustment value and determining the blue adjustment value further comprise:
    if a color temperature of a light source in a color temperature category is less than a first preset value, then determining the red adjustment value according to a product of a first preset coefficient and the first difference value and determining the blue adjustment value according to a product of a second preset coefficient and the second difference value, wherein
    the second preset coefficient is greater than the first preset coefficient.

3. The white balance parameter determination method of claim 2, wherein determining the red adjustment value further comprises:
    if the first difference value is less than a preset threshold, then calculating a product of the first difference value and a first subcoefficient to be the red adjustment value; and
    if the first difference value is greater than or equal to the preset threshold, then calculating a product of the first difference value and a second subcoefficient to be the red adjustment value, wherein
    the first subcoefficient is greater than the second subcoefficient.

4. The white balance parameter determination method of claim 3, wherein the red adjustment value is calculated according to:
    $r=2x/3$, if the first difference value is between 0 and 300, where r represents the red adjustment value and x represents the first difference value;
    $r=x/3+100$, if the first difference value is greater than or equal to 300; and
    the blue adjustment value is calculated according to:
    $b=10y/3$, where b represents the blue adjustment value and y represents the second difference value.

5. The white balance parameter determination method of claim 2, wherein determining the red adjustment value and determining the blue adjustment value further comprise:
    if a color temperature of a light source in a color temperature category is greater than a second preset value, then the red adjustment value is determined according to a product of a third preset coefficient and the first difference value and the blue adjustment value is determined according to a product of a third preset coefficient and the second difference value.

6. The white balance parameter determination method of claim 5, wherein the red adjustment value or the blue adjustment value is calculated according to:
    $r=2x/5$ or $b=2y/5$, where r represents the red adjustment value, x represents the first difference value, b represents the blue adjustment value, and y represents the second difference value.

7. The white balance parameter determination method of claim 1, wherein the final parameter table further comprises:
    a brightness dimension having a plurality of brightness levels; and
    the final red adjustment value and the final blue adjustment value corresponding to each color temperature category and each of the plurality of brightness levels.

8. A white balance adjustment method, comprising:
obtaining raw images captured by a camera device in each of a set of color temperature categories, each color temperature category having a different color temperature value range;
calculating a red average value (Ravg) and a blue average value (Bavg) of each raw image, with a green average value (Gavg) of each raw image being a preset value;
in each color temperature category, determining a red adjustment value according to a first difference value between the Ravg of each raw image and a Ravg of a golden set and determining a blue adjustment value according to a second difference value between the Bavg of each raw image and a Bavg of the golden set;
in each color temperature category, determining a final red adjustment value using the red adjustment value and a preset red adjustment value in a preset parameter table and determining a final blue adjustment value using the blue adjustment value and a preset blue adjustment value in the preset parameter table, the final red adjustment value and final blue adjustment value in each color temperature category forming a final parameter table to be used for white balance adjustment;
obtaining an image to be adjusted with the camera device and a color temperature of a light source under which the image to be adjusted was captured;
determining the color temperature category to which the color temperature of the light source belongs and looking up in the final parameter table the final red adjustment value and the final blue adjustment value in the color temperature category; and
adjusting a red component and a blue component of each pixel in the image to be adjusted using the final red adjustment value and the final blue adjustment value.

9. The white balance adjustment method of claim 8, wherein:
obtaining an image to be adjusted further comprises obtaining a brightness of the image to be adjusted;
the final parameter table further comprises:
a brightness dimension having a plurality of brightness levels; and
the final red adjustment value and the final blue adjustment value corresponding to each color temperature category and each of the plurality of brightness levels; and
looking up in the final parameter table further comprises looking up the final red adjustment value and the final blue adjustment value in the color temperature category and brightness level corresponding to the color temperature of the light source and the brightness of the image to be adjusted.

10. The white balance adjustment method of claim 8, wherein adjusting the red component and blue component of each pixel comprises:
calculating a first product of the final red adjustment value and a red component of each pixel, and calculating a quotient of the first product and the preset value to be an adjusted red component of each pixel;
calculating a second product of the final blue adjustment value and a blue component of each pixel, and calculating a quotient of the second product and the preset value to be an adjusted blue component of each pixel.

11. A white balance adjustment device comprising:
a processor; and
a memory storage device storing instructions executable by the processor to:
obtain raw images captured by a camera device in each of a set of color temperature categories, each color temperature category having a different color temperature value range;
calculate a red average value (Ravg) and a blue average value (Bavg) of each raw image, with a green average value (Gavg) of each raw image being a preset value;
determine, in each color temperature category, a red adjustment value according to a first difference value between the Ravg of each raw image and a Ravg of a golden set and determining a blue adjustment value according to a second difference value between the Bavg of each raw image and a Bavg of the golden set; and
determine, in each color temperature category, a final red adjustment value using the red adjustment value and a preset red adjustment value in a preset parameter table and determining a final blue adjustment value using the blue adjustment value and a preset blue adjustment value in the preset parameter table, the final red adjustment value and final blue adjustment value in each color temperature category forming a final parameter table to be used for white balance adjustment.

12. The white balance adjustment device of claim 11, wherein determining the red adjustment value and determining the blue adjustment value further comprise:
if a color temperature of a light source in a color temperature category is less than a first preset value, then determining the red adjustment value according to a product of a first preset coefficient and the first difference value and determining the blue adjustment value according to a product of a second preset coefficient and the second difference value, wherein
the second preset coefficient is greater than the first preset coefficient.

13. The white balance adjustment device of claim 12, wherein determining the red adjustment value further comprises:
if the first difference value is less than a preset threshold, then calculating a product of the first difference value and a first subcoefficient to be the red adjustment value; and
if the first difference value is greater than or equal to the preset threshold, then calculating a product of the first difference value and a second subcoefficient to be the red adjustment value, wherein
the first subcoefficient is greater than the second subcoefficient.

14. The white balance adjustment device of claim 13, wherein the red adjustment is calculated according to:
$r=2x/3$, if the first difference value is between 0 and 300, where r represents the red adjustment value and x represents the first difference value;
$r=x/3+100$, if the first difference value is greater than or equal to 300; and
the blue adjustment value is calculated according to:
$b=10y/3$, where b represents the blue adjustment value and y represents the second difference value.

15. The white balance adjustment device of claim 12, wherein determining the red adjustment value and determining the blue adjustment value further comprise:
if a color temperature of a light source in a color temperature category is greater than a second preset value, then the red adjustment value is determined according to a product of a third preset coefficient and the first difference value and the blue adjustment value is determined according to a product of a third preset coefficient and the second difference value.

16. The white balance adjustment device of claim 15, wherein the red adjustment value or the blue adjustment value is calculated according to:

r=2x/5 or b=2y/5, where r represents the red adjustment value, x represents the first difference value, b represents the blue adjustment value, and y represents the second difference value.

17. The white balance adjustment device of claim 11, wherein the final parameter table further comprises:
    a brightness dimension having a plurality of brightness levels; and
    the final red adjustment value and the final blue adjustment value corresponding to each color temperature category and each of the plurality of brightness levels.

18. The white balance adjustment device of claim 11, wherein the instructions executable by the processor further comprise instructions to:
    obtain an image to be adjusted with the camera device and a color temperature of a light source under which the image to be adjusted was captured;
    determine the color temperature category to which the color temperature of the light source belongs and looking up in the final parameter table the final red adjustment value and the final blue adjustment value in the color temperature category; and
    adjust a red component and a blue component of each pixel in the image to be adjusted using the final red adjustment value and the final blue adjustment value.

19. The white balance adjustment device of claim 18, wherein:
    obtaining an image to be adjusted further comprises obtaining a brightness of the image to be adjusted;
    the final parameter table further comprises:
        a brightness dimension having a plurality of brightness levels; and
        the final red adjustment value and the final blue adjustment value corresponding to each color temperature category and each of the plurality of brightness levels; and
    looking up in the final parameter table further comprises looking up the final red adjustment value and the final blue adjustment value in the color temperature category and brightness level corresponding to the color temperature of the light source and the brightness of the image to be adjusted.

20. The white balance adjustment device of claim 18, wherein adjusting the red component and blue component of each pixel comprises:
    calculating a first product of the final red adjustment value and a red component of each pixel, and calculating a quotient of the first product and the preset value to be an adjusted red component of each pixel; and
    calculating a second product of the final blue adjustment value and a blue component of each pixel, and calculating a quotient of the second product and the preset value to be an adjusted blue component of each pixel.

21. A non-transitory computer readable storage medium on which computer instructions are stored, the instructions executable by at least once processor to:
    obtain raw images captured by a camera device in each of a set of color temperature categories, each color temperature category having a different color temperature value range;
    calculate a red average value (Ravg) and a blue average value (Bavg) of each raw image, with a green average value (Gavg) of each raw image being a preset value;
    determine, in each color temperature category, a red adjustment value according to a first difference value between the Ravg of each raw image and a Ravg of a golden set and determining a blue adjustment value according to a second difference value between the Bavg of each raw image and a Bavg of the golden set; and
    determine, in each color temperature category, a final red adjustment value using the red adjustment value and a preset red adjustment value in a preset parameter table and determining a final blue adjustment value using the blue adjustment value and a preset blue adjustment value in the preset parameter table, the final red adjustment value and final blue adjustment value in each color temperature category forming a final parameter table to be used for white balance adjustment.

* * * * *